(12) United States Patent
Giordano et al.

(10) Patent No.: US 6,473,436 B1
(45) Date of Patent: Oct. 29, 2002

(54) DIGITAL LOOP CARRIER

(75) Inventors: Glenn A. Giordano, Allen; Martin P. J. Cornes, Plano; Robert E. Montgomery, Carrollton, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/014,043

(22) Filed: Jan. 27, 1998

(51) Int. Cl.[7] .............................................. H04L 12/43
(52) U.S. Cl. ....................................... 370/458; 370/463
(58) Field of Search ................................. 370/458, 466, 370/467, 476, 267, 438, 463, 538, 386, 357; 379/201, 205

(56) References Cited

U.S. PATENT DOCUMENTS

| | | | |
|---|---|---|---|
| 4,228,536 A | | 10/1980 | Gueldenpfennig et al. |
| 4,627,050 A | * | 12/1986 | Johnson et al. .............. 370/363 |
| 4,943,996 A | * | 7/1990 | Baker, Jr. et al. ........... 379/201 |
| 4,993,019 A | | 2/1991 | Cole et al. |
| 5,105,421 A | | 4/1992 | Gingell |
| 5,151,896 A | | 9/1992 | Bowman et al. |
| 5,161,152 A | * | 11/1992 | Czerwiec et al. ............ 370/463 |
| 5,276,678 A | | 1/1994 | Hendrickson et al. |
| 5,355,362 A | | 10/1994 | Gorshe et al. |
| 5,383,191 A | * | 1/1995 | Hobgood et al. ............ 370/223 |
| 5,497,363 A | | 3/1996 | Gingell |
| 5,608,720 A | * | 3/1997 | Biegel et al. ................ 370/249 |
| 5,694,398 A | | 12/1997 | Doll et al. |
| 5,784,377 A | * | 7/1998 | Baydar et al. ............... 370/386 |

FOREIGN PATENT DOCUMENTS

WO    98/25382    6/1998

* cited by examiner

*Primary Examiner*—Kwang Bin Yao
*Assistant Examiner*—Prenell Jones
(74) *Attorney, Agent, or Firm*—Jackson Walker L.L.P.; Richard A. Mysliwiec; V. Lawrence Sewell

(57) ABSTRACT

A telecommunications system has identical access terminal shelves and an intershelf bus interconnecting each shelf. Each access terminal shelf has transmission card slots constructed to accept different types of transmission cards that use different types of transmission media to communicate with remote telecommunications equipment and a processor programmed to determine whether transmissions from the remote telecommunications equipment are to be transferred to the intershelf bus for connection completion.

17 Claims, 6 Drawing Sheets

DIGITAL LOOP CARRIER

BACKGROUND

The invention is related to telecommunications systems access equipment such as digital loop carriers.

Telecommunications terminals connect subscriber lines, such as POTS (Plain Old Telephone Service) and ISDN (Integrated Services Digital Network) lines, to telecommunications equipment such as a telecommunications switch, e.g., a class 5 switch. Telecommunications switches connect and route messages between different lines.

A telecommunications terminal contains channel unit card slots that accept channel unit cards. Channel unit cards convert analog and digital signals from subscriber lines into formatted digital data signals. Different types of channel unit cards service different types of subscriber lines (e.g. POTS or ISDN). The terminal constructs one or more time division multiplexed (TDM) signals from several channel unit cards' formatted digital data signals for transmission to remote telecommunications equipment for example, another telecommunications terminal. The terminal also demultiplexes TDM signals received from remote telecommunications equipment to deliver formatted digital data back to the channel unit cards. Channel unit cards convert the formatted digital data into a form suitable for transmission over subscriber lines.

Two telecommunications terminals can be connected "back-to-back" to form a digital loop carrier (DLC) network. A DLC typically includes a remote terminal (RT) placed near a business or residence and a central terminal (CT) placed in a central exchange connected to a telecommunications switch. The RT and CT communicate over a single or multiple lines carrying TDM signals. This configuration connects subscribers to the telecommunications switch via the DLC. A digital loop carrier (DLC) at a central terminal (CT) includes a multiplexor which, using TDM, can multiplex multiple analog and digital signals from subscriber telephone lines into a single or multiple T1 signal. A mirror DLC located at a remote terminal (RT) can decode the multiplexed T1 signal into a form suitable for transmission over subscriber telephone lines. This data flow also occurs in the opposite direction from RT to CT.

SUMMARY

In general, in one aspect, a telecommunications system has access terminal shelves and an intershelf bus interconnecting each access terminal shelf. Each access terminal shelf has transmission card slots. These slots are constructed to accept different types of transmission cards. Each different type of transmission card may use a different type of transmission medium to communicate with remote telecommunications equipment. The telecommunications system also includes a processor programmed to determine whether, to complete the connection, a transmission from the remote telecommunications equipment needs to be transferred via the intershelf bus to another shelf in the terminal.

In accordance with various implementations, the intershelf bus structure may be controlled by a bus controller. The intershelf bus may include two bidirectional data buses with complementary timing, a timing and synchronization bus and a control local area network. The intrashelf bus structure includes a control bus, a time division multiplexed bus and a timing bus.

A method of handling transmission in a telecommunications system having a plurality of identical shelves includes communicating with remote telecommunications equipment, accepting different types of transmissions from the remote telecommunications equipment over different types of transmission media and determining whether the accepted transmissions need to be transferred from a shelf that accepted them to another shelf via an intershelf bus structure to complete connection.

In accordance with various implementations, transferring of transmissions between shelves via the intershelf bus structure may be controlled by a bus controller. The determination of whether transmissions need to be transferred is performed by a processor residing on each shelf.

Advantages may includes one or more of the following. Telephone service providers will be able to construct a digital loop carrier without requiring an expensive master control shelf. Digital loop carriers constructed using the configurations described here are expandable on as-needed basis. Moreover, system efficiency will increase due to the distributed processing configuration. Other advantages and features will become apparent from the following description including the drawings and claims.

DETAILED DESCRIPTION

Figure 1:
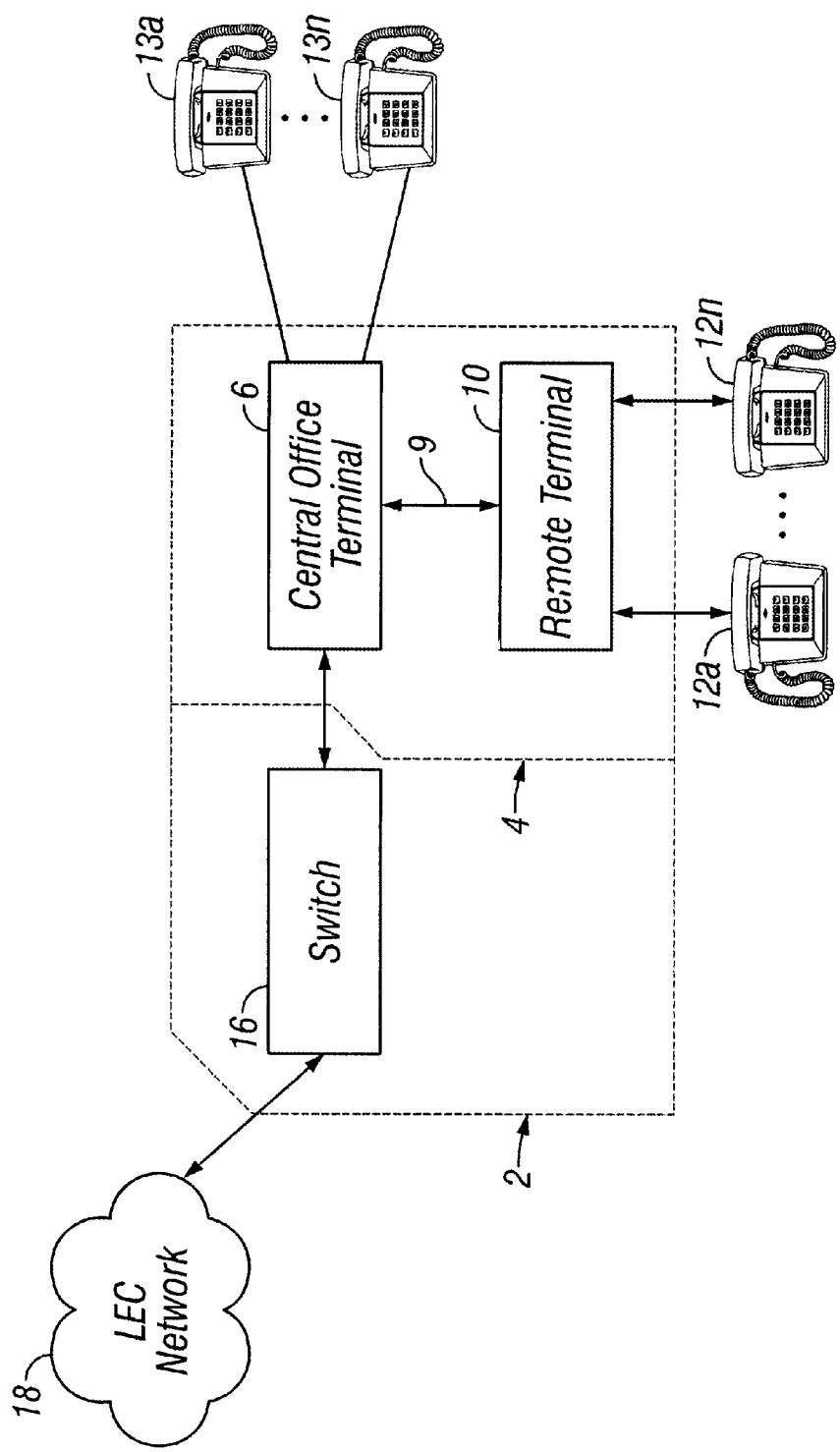
FIG. 1 is a diagram of a telecommunications system.

As shown in FIG. 1, a telecommunications system 2 includes a digital loop carrier (DLC) 4. DLC 4 includes a central office terminal (CT) 6 coupled to one or more remote terminals (RT) 10 via metallic, fiber or other suitable communication media 9. DLC 4 performs call control and management signals and provides central office call processing functions. Subscriber devices, such as telephone service equipment 12a–n, 13a–n, can be coupled to the central office terminal 6 and to the remote terminal 10. The central office terminal 6 also is coupled to a local exchange carrier (LEC) network 18, optionally through a switch 16, such as a class 5 switch.

Figure 2:
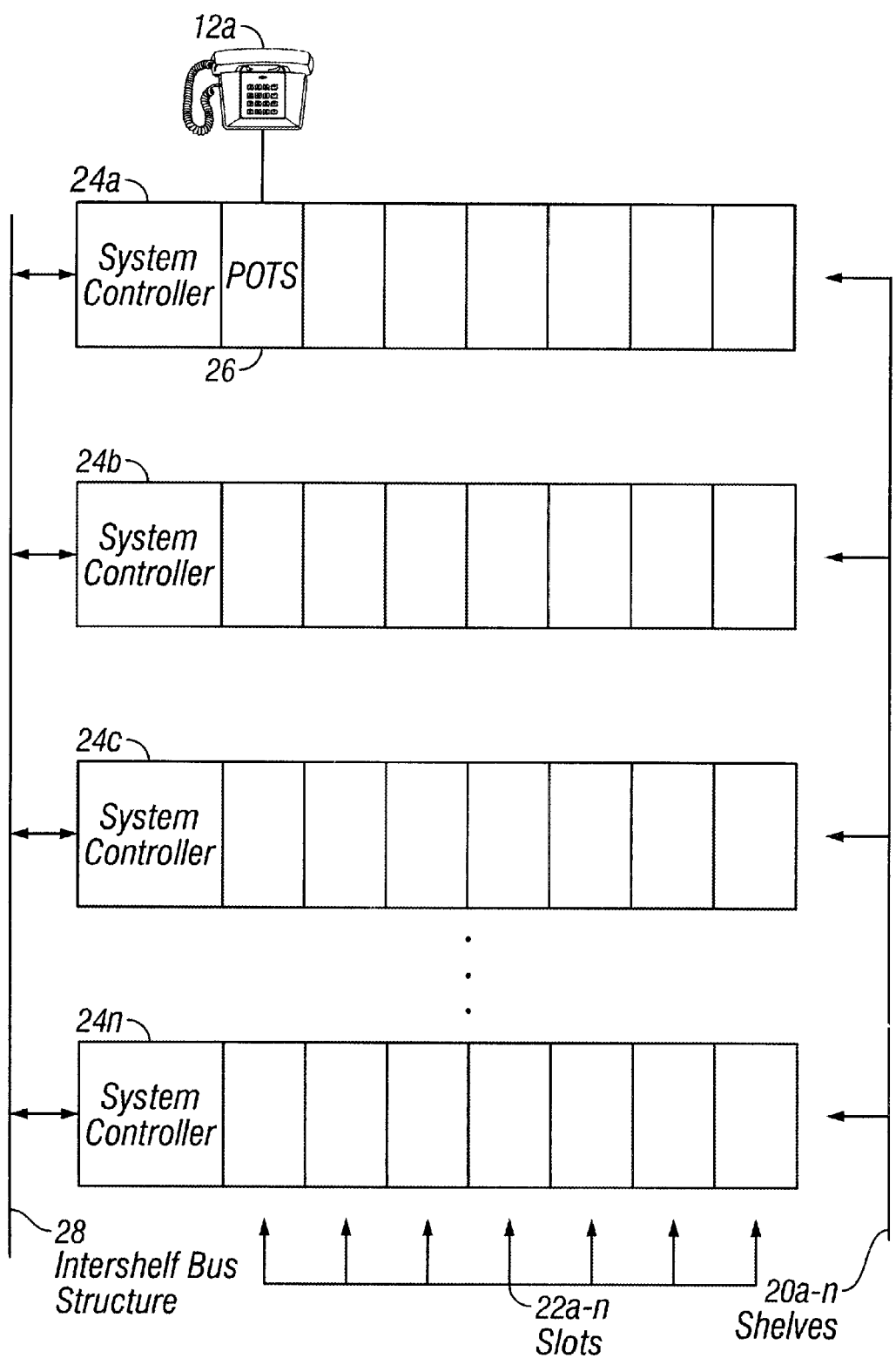
FIG. 2 is a diagram of DLC components.

As shown in FIG. 2, an access terminal 10 contains shelves 20a–n that have slots 22a–n for accepting a variety of cards. Certain slots are dedicated to one type of card, e.g., service module slots are able to accept service module cards. Different cards perform different terminal functions. An inserted card connects to the terminal's backplane via a connector in slots 22a–n (not shown). The backplane contains a variety of buses including a subscriber bus (not shown) that electronically connects each inserted terminal card to every other terminal card. Many slots 22a–n, including those that hold service module cards, have a "hot condition" capability that allows an administrator to insert and remove cards without interrupting terminal operation.

Several types of slots 22a–n exist with many slots per shelf. Service module slots can hold any type of service module. Different service modules serve different kinds of narrowband (e.g. POTS, COIN, UVG/EWG, EM4, U4W, and BRIU) and wideband (e.g. ISDN, DS1U, T1U, ADS1U, AT1U, E1, E1S, E1L, and E1Conc) subscriber lines. Many of the slots in each shelf are dedicated service module slots. Also, every shelf has a dedicated slot for each of the following cards: a System Controller (SC) card, Bank Power Supply and Ringing Generator (BPS/RG) card, and an Alarm Maintenance Unit (AMU) card.

In a typical configuration shown in FIG. 2, a subscriber device 12a is coupled to POTS card 26 which is inserted into one of the service module slots and thereby becomes associated with a channel on a transport, such as E1 or T1, of one of the SC cards 24a–n. Although POTS card 26 is shown to be connected only to a single subscriber device 12a, in practice each service module used in the system could handle multiple connections.

The access terminal shelves 20a–n are connected through an intershelf bus 28 in a distributed processing configuration. In this configuration, each shelf 20a–n is able to communicate with each of the other shelves in an equal, as opposed to a master-slave, relationship. An advantage of having equality among the shelves is that each shelf can make decisions that only affect itself. For example, if a subscriber's call is handled by the terminal shelf containing the connection that the call is requesting, the subscriber will be connected without involving any of the other shelves. This distributed processing structure reduces cost by eliminating the need to purchase a costly master shelf. Another advantage of this configuration is that it increases flexibility by allowing virtually any number of these shelves to be interconnected at any time. Thus, the capacity of DLC 4 can grow or shrink as desired based on the particular needs of a telephone service provider.

Figure 3:
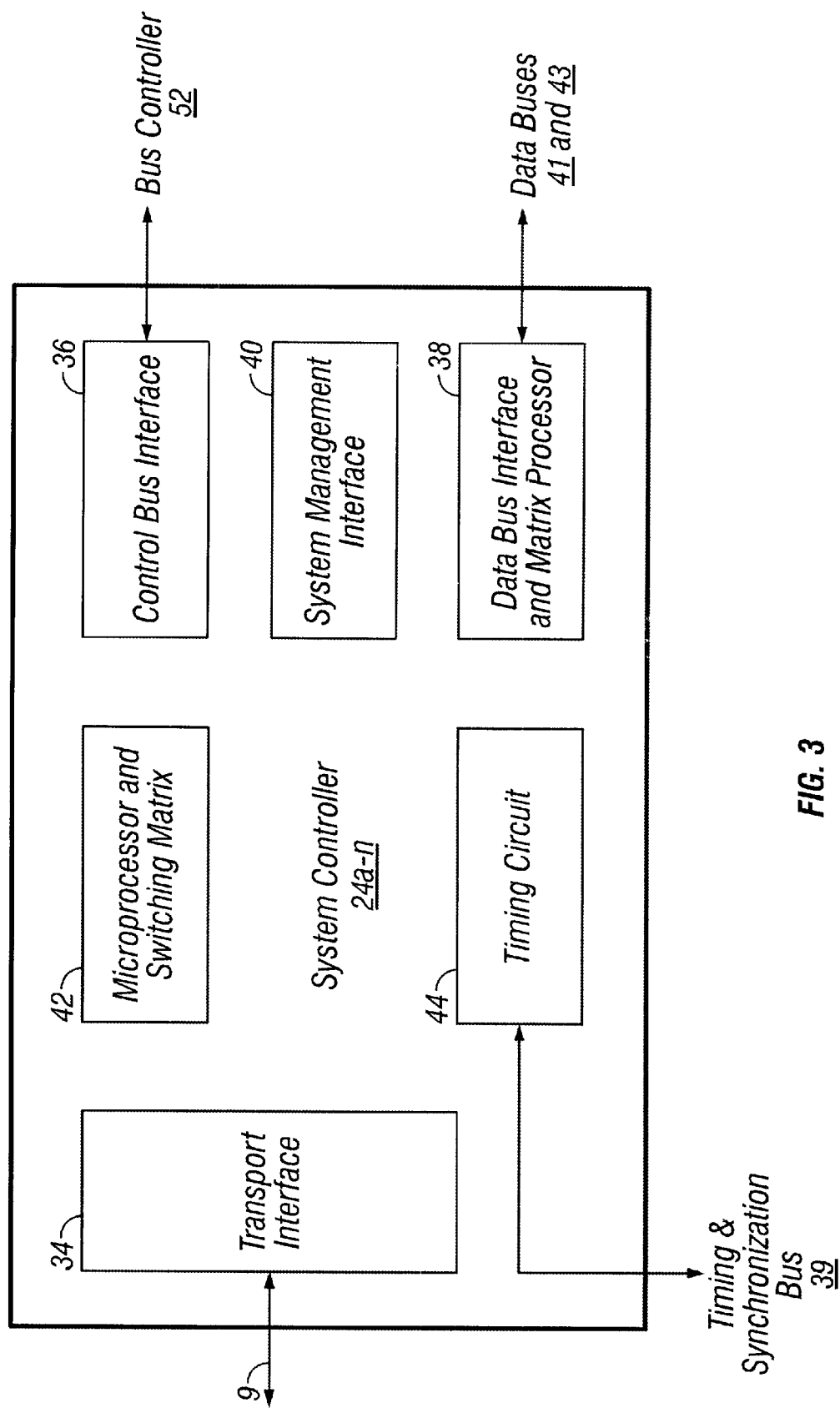
FIG. 3 is a block diagram of components of a system controller.

FIG. 3 shows a diagram of the system controller which includes a transport interface 34 that manages the connection 9 to the central terminal and a control bus interface 36 that manages the connection to bus controller 52. A data bus interface and matrix processor 38 also is included and is used to manage data buses 41 and 43. A timing circuit 44 handles the timing and synchronization of the system through the timing and synchronization bus 39 and a system management interface 40 oversees system processes. The system controller also contains a microprocessor and switching matrix 42 programmed to determine connection locations and perform proper switching in cases that intershelf hand-off (call transfer) is unnecessary. The microprocessor and switching matrix 42 of each shelf also is responsible for accepting signals handed-off from other shelves and for performing the proper switching in those cases.

Figure 4:
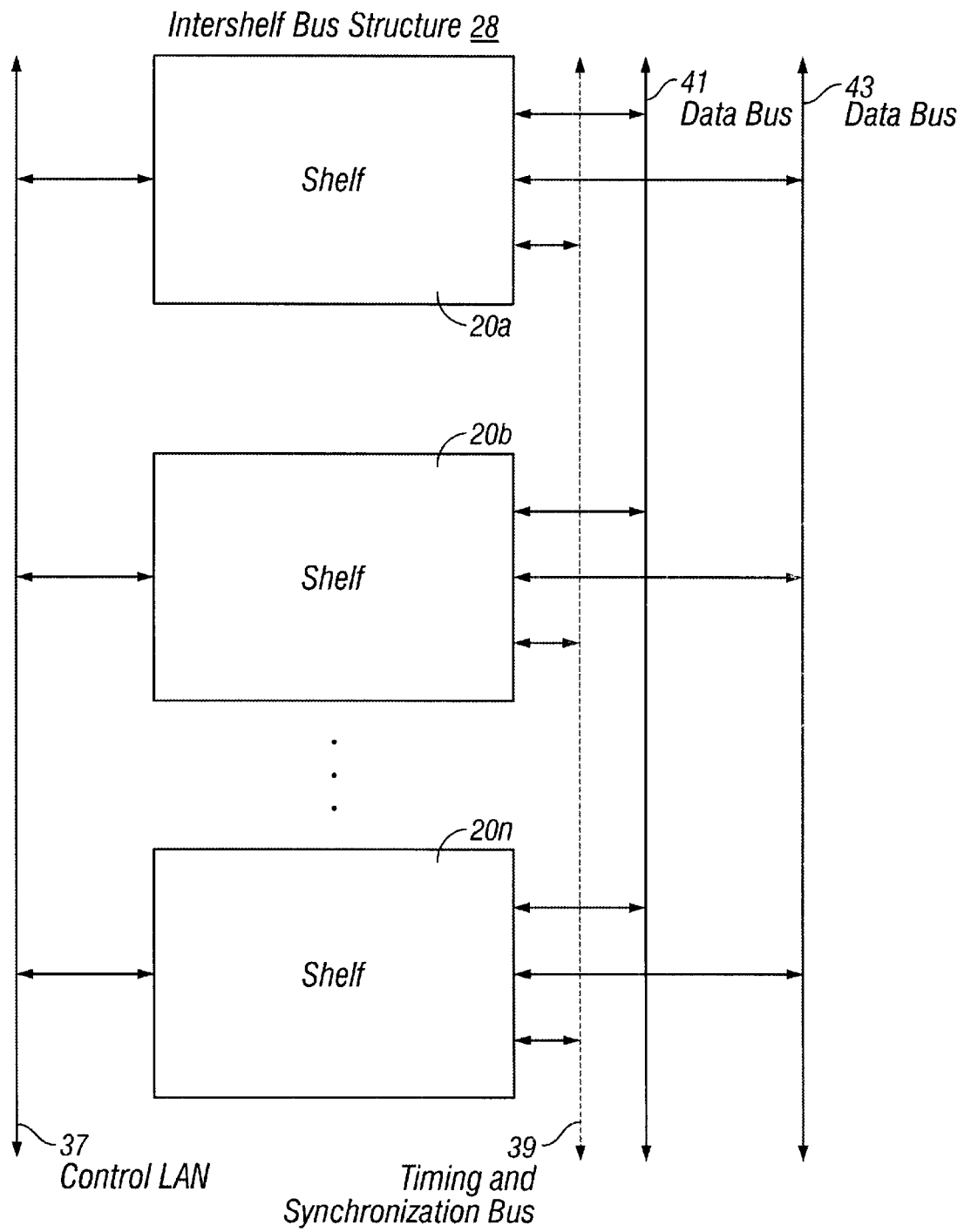
FIGS. 4 and 5 are diagrams of an inter-shelf bus structure.
Figure 5:
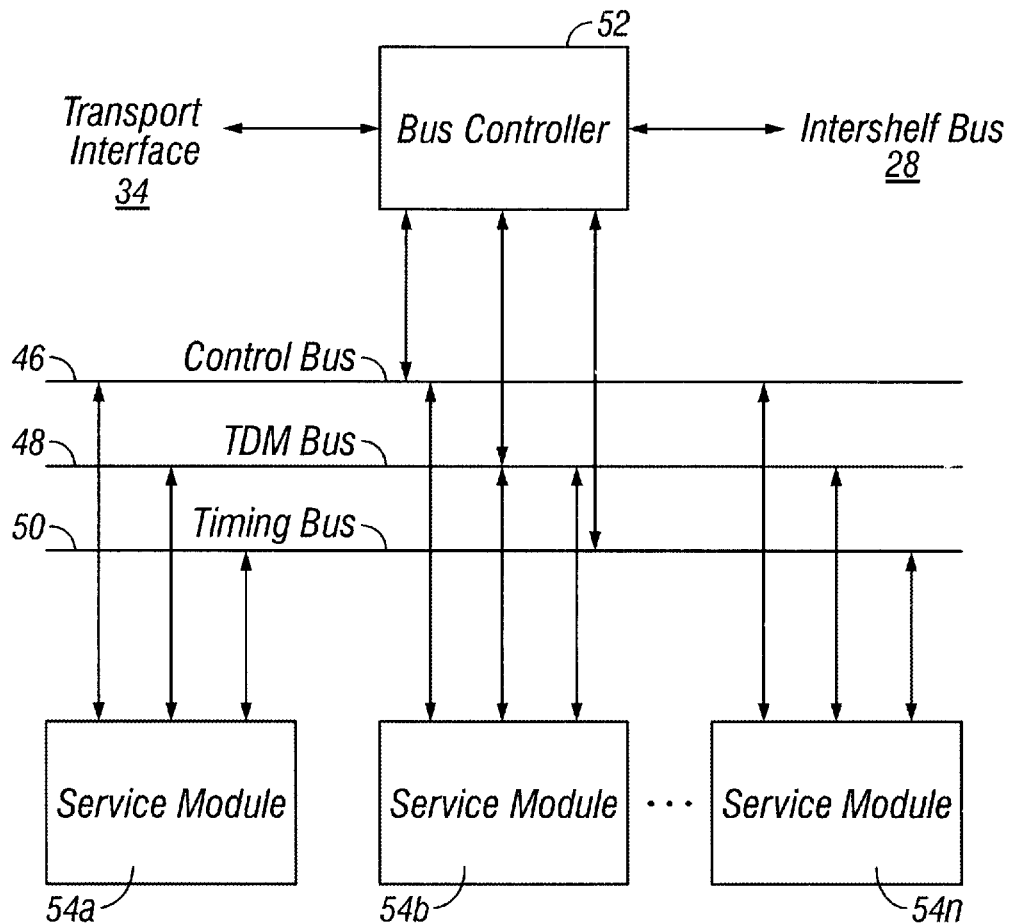

The intershelf bus structure 28 shown in FIG. 4 enables the interconnection of shelves 20a–n while the intrashelf bus structure 45 shown in FIG. 5 enables the service modules to be connected to the SC. In FIG. 4, intershelf bus structure 28 includes a pair of data buses 41 and 43 for data flow between the shelves, a timing and synchronization bus 39 and a control local area network (LAN) 37.

The timing of bus 41 is 180 degrees out of phase of the timing of bus 43. Essentially, in this configuration bus 41 and bus 43 will become available in succession which allows signals to be bused more effectively. Though one bus may be used, the provision of two bidirectional data paths between the shelves increases system efficiency and reduces system delay. It should be understood that the use of two synchronous buses with complementary timing is merely exemplary and other variations of both synchronously and asynchronously timed buses configured in different timing schemes may be used.

Timing and synchronization bus 39 is used to transfer signals from timing circuit 44 (FIG. 3) from one shelf to another shelf. Similarly, the control LAN 37 is used to send control signals between the shelves.

As shown in FIG. 5, the intrashelf bus connects service modules 54a–n to bus controller 52. Each of the service modules is inserted into a dedicated service module slot of slots 20a–n. Bus controller 52 is responsible for routing and managing the connections between the off terminal elements, such as transport interface 34 or service modules 54a–n, and the terminal's intershelf bus 28. Each of the shelves 20a–n has an intrashelf bus structure 45. The intrashelf bus includes a control bus 46, time division multiplexed (TDM) bus 48 and timing bus 50, each of which has connections to service modules 54a–n and bus controller 52. Control bus 46, TDM bus 48, and timing bus 50 are used to transfer control signals, time division multiplexed signals and timing signals respectively between service modules 54a–n and bus controller 52.

The intrashelf bus generally always will be used when line activities occur, while the intershelf bus generally only will be used for certain activities, i.e., all calls received by a shelf will use the intrashelf bus while only calls being connected through a different shelf will use the intershelf bus. Line activities occur either on the subscriber side or the LEC network side of the terminal.

Subscriber line activities include events which are detected by the terminal and which may need to be reported or delivered to other system components, e.g., remote terminal 10 reporting to terminal 6 and LEC network 18. Subscriber line activities include, for example, detecting that an off-hook detector is active or inactive, detecting a dialed pulse, acknowledging completion of an initial ring, and detection of a hookflash condition.

LEC network 18 line activities include events which occur away from the terminal and may need to be reported to the terminal. Such activities include, for example, the fact that a called party answered the call, that the party at the remote end terminated the call, the start and cadence of ringing, notification to start subscriber pulse metering and notification of pulsed polarity, polarity type, and the start or completion of trunk conditioning.

Figure 6:
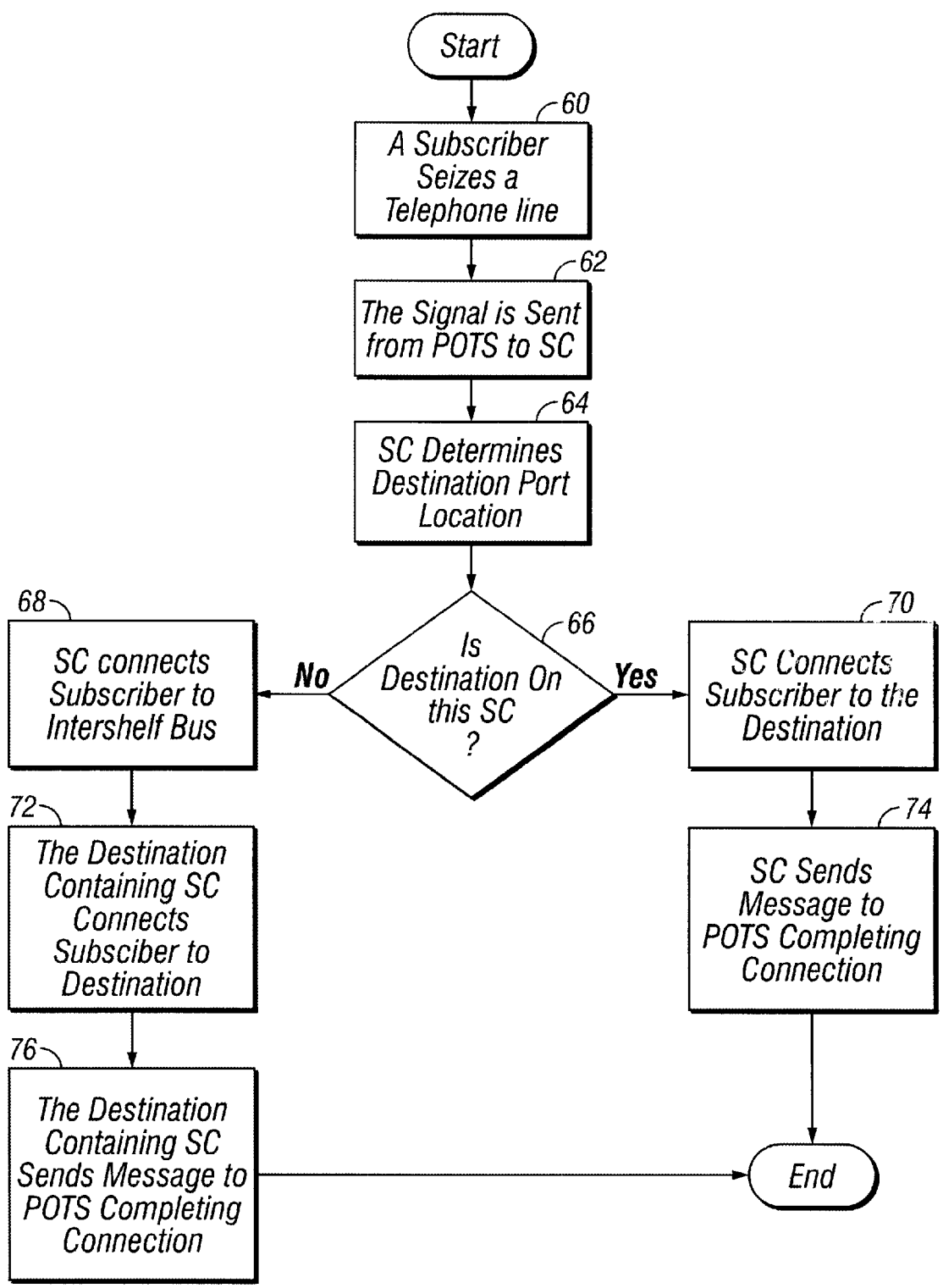
FIG. 6 is a flow chart of DLC operation.

FIG. 6 illustrates a call processing path diagram. When a subscriber line activity occurs, such as seizing of a line by a subscriber (step 60), the particular POTS card that accepted the call signal notifies the SC responsible for the shelf in which the POTS card is inserted (step 62). The SC determines by communicating with the LEC network over a predetermined control channel the port to which the subscriber is to be connected (i.e., the "destination port") (step 64). A destination port may be on the same shelf as the POTS card that accepted the signal or may be on another shelf.

The SC determines, what steps to follow to complete the connection (step 66). If the destination port is a connection of the originating SC, the subscriber is connected to the port by that SC (step 70) and a signal is sent back to the POTS card to complete the connection (step 74). If, however, the destination port is a connection on a different shelf, the originating SC connects the subscriber to intershelf bus 28 through bus controller 52 (step 68). The SC containing the connection to the destination port then connects the subscriber to the assigned port (step 72) and sends a signal back to the POTS card to complete the connection (step 76). When the originating POTS card receives the signal to complete the connection, it connects the subscriber to intrashelf bus 45 and the connection is complete.

Although the foregoing implementations have been described with respect to a POTS card, other types of digital or analog channel unit cards also can be used. Additionally, although the foregoing techniques have been described with respect to a digital loop carrier system having a central office terminal and a remote terminal, the techniques can be used in a stand-alone access terminal as well.

In some implementations, a single LEC network may include various components that allow the LEC network to handle signals or messages using more than one protocol. In that case, a single access terminal can accommodate multiple channel unit cards coupled to the LEC network even though different channel unit cards use different protocols when communicating with the LEC network.

Other embodiments are within the scope of the following claims.

What is claimed is:

1. A method of managing telecommunications traffic in a telecommunications access terminal having a first shelf, a second shelf, and an intershelf bus connecting the shelves, the method comprising:

receiving a transmission from external telecommunications equipment on the first shelf;

determining, on the first shelf, that a destination of the received transmission is not on the first shelf;

transferring the received transmission to the intershelf bus; and processing the received transmission on the second shelf to complete a connection of the received transmission to the destination.

2. The method of claim 1 wherein the completing of the connection is performed by a processor resident on the second shelf.

3. The method of claim 2, further comprising controlling the transfer of the received transmission between the first and second shelves using a bus controller.

4. A telecommunications system including a number of shelves comprising:

means for communicating with remote telecommunications equipment;

means for accepting a transmission from the remote telecommunications equipment;

means for determining, located on each shelf, whether completion of a connection of an accepted transmission can be made on a shelf that accepted the transmission;

means for transferring the accepted transmission to a different shelf; and means for completing the connection of the accepted transmission,
wherein the completing means is located on the different shelf.

5. Software, stored on a computer-readable medium, for a telecommunications access terminal having a plurality of shelves, the software comprising instructions for causing one or more computers to perform the following operations:

receive a transmission from external telecommunications equipment;

determine, on a shelf receiving the transmission, if a destination of the transmission is on the shelf receiving the transmission; and transfer the transmission from a shelf processor of the shelf receiving the transmission to a shelf processor of a shelf including the destination of the received transmission, wherein the second shelf s processor completes the transmission.

6. A telecommunications system communicating with external telecommunications equipment comprising:

a plurality of access terminal shelves for receiving the transmission from an external telecommunications equipment;

a processor, located on each access terminal shelf, programmed to complete a connection for a received transmission having a destination on its shelf, to hand-off a received transmission having a destination on another shelf, and to complete a transmission, handed-off from one of the access terminal shelves and having a destination on its shelf; and an intershelf bus connected to the access terminal shelves for transferring a received transmission handed-off from one of the access shelves to a different access shelf.

7. A telecommunications system communicating with external telecommunications equipment comprising:

a plurality of access terminal shelves for receiving the transmission from an external telecommunications equipment;

a processor, located on each access terminal shelf, programmed to complete a connection for a received transmission having a destination on its shelf, to hand-off a received transmission having a destination on another shelf, and to complete a transmission, handed-off from one of the access terminal shelves and having a destination on its shelf;

an intershelf bus connected to the access terminal shelves for transferring a received transmission handed-off from one of the access shelves to a different access shelf, and a switching matrix located on each shelf, wherein the processor and the switching matrix perform switching for the received transmission having a destination on the processor's shelf.

8. The telecommunications system of claim 6 wherein the system can be expanded by adding an access terminal shelf.

9. The telecommunications system of claim 6 wherein each access terminal shelf further comprises:

a plurality of service module slots constructed to accept different types of service modules, the service modules using a transmission media to communicate with remote telecommunications equipment; and an intrashelf bus structure connecting the service module slots.

10. The telecommunications system of claim 6, wherein the intershelf bus structure is controlled by a bus controller.

11. The telecommunications system of claim 6, wherein the intershelf bus comprises:

two bidirectional data buses with complementary timing;

a timing and synchronization bus; and a control local area network.

12. The telecommunications system of claim 9, wherein the intrashelf bus structure comprises:

a control bus;

a time division multiplexed bus; and a timing bus.

13. A method of handling a transmission in a telecommunications terminal having a first access shelf including a first shelf port and a first shelf processor and a second access shelf including a second shelf port, and a second shelf processor, the method comprising:

detecting a transmission received at the first shelf port by the first shelf processor;

determining, by the first shelf processor, that a destination of the received transmission is on another shelf;

handing-off the received transmission from the first shelf processor;

accepting the handed-off received transmission by the second shelf processor; and completing, by the second shelf processor, the connection of the received transmission from the first shelf port to the second shelf port.

14. The method of claim 13 wherein the telecommunications terminal includes an intershelf bus and handing-off the received transmission comprises connecting the first shelf port to an intershelf bus.

15. The method of claim 14 wherein completing the connection comprises connecting the second shelf port to the intershelf bus and sending a signal from the second processor to the first shelf port to complete the connection.

16. The method of claim 13 wherein the first shelf contains a third shelf port and the method further comprises:

determining, by the first shelf processor, that the destination of a received transmission is the third shelf port; and completing a connection from the first shelf port to the third shelf port.

17. The method of claim 16 wherein completing the connection to the third port comprises connecting the first shelf port and third shelf port to an intrashelf bus.

* * * * *